United States Patent Office 3,483,765
Patented Dec. 16, 1969

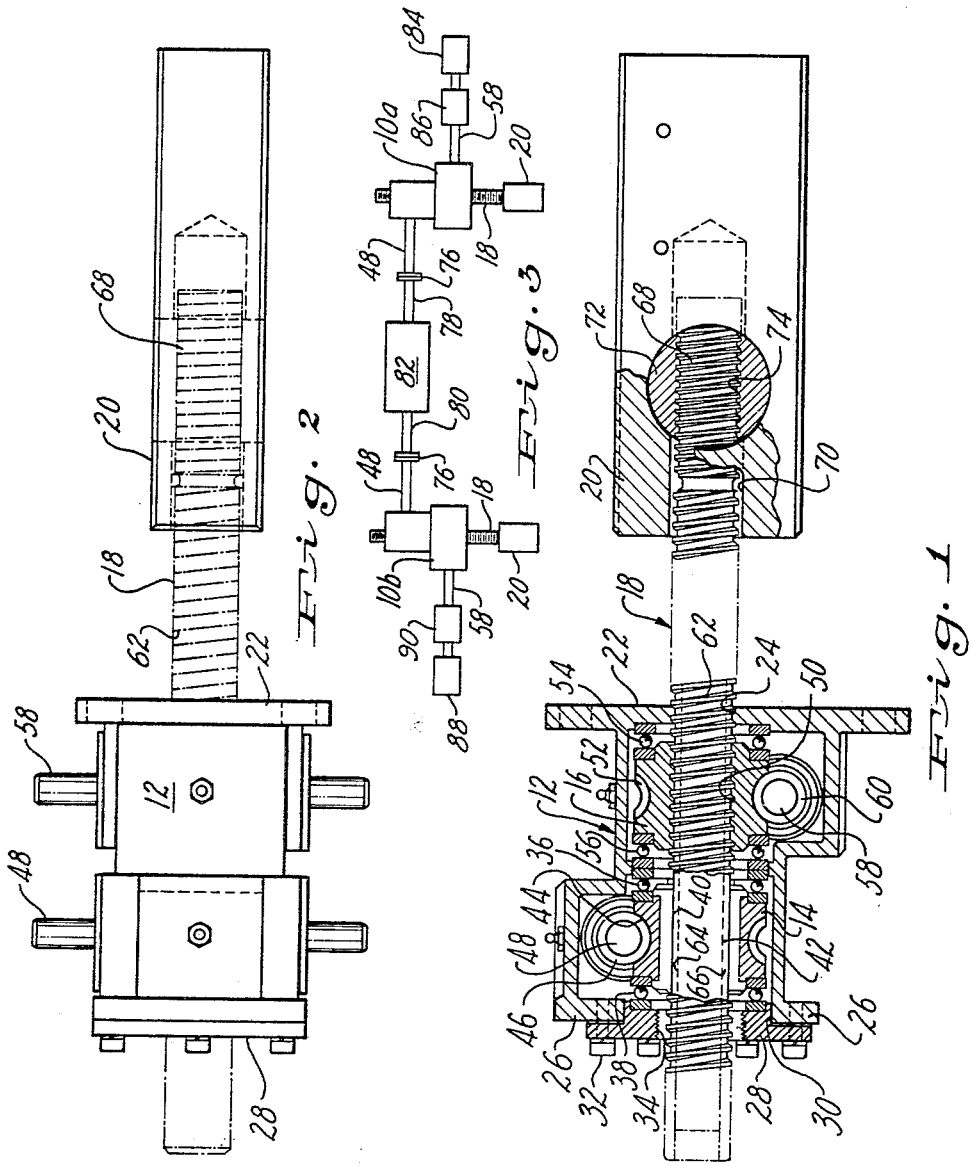

3,483,765
MECHANICAL ACTUATOR
Augustine A. Fornataro, Elwood City, Pa., assignor to Voss Engineering Company, Callery, Pa., a corporation of Pennsylvania
Filed Apr. 13, 1967, Ser. No. 630,617
Int. Cl. F16h 1/18, 27/02, 29/20
U.S. Cl. 74—89.14                                  4 Claims

ABSTRACT OF THE DISCLOSURE

An apparatus for selectively converting the rotary motion of two different drive members to linear motion of a driven member. The driven member is connected to a shaft that is rotatably supported in a housing. The shaft is threadably connected to one drive member and nonrotatably connected to a second drive member. The drive members are rotatably supported within the housing. The drive members are in turn each connected to a separate rotating means. Rotation of the threadably connected drive member while the drive member nonrotatably connected to the shaft is restrained from rotation, moves the shaft longitudinally relative to the housing and moves the driven member. Rotation of the drive member that is nonrotatably secured to the shaft while the drive mechanism that is threadably connected to the shaft is restrained from rotation, moves the shaft longitudinally relative to the actuator mechanism housing and moves the driven member.

BACKGROUND OF THE INVENTION

Field of the invention

This invention relates to a mechanical actuator that converts rotary motion to linear motion. More particularly, the invention relates to a mechanical actuator that converts the rotary motion of either of two drive means into linear motion of a driven member.

Description of the prior art

For certain applications, it is necessary to accurately advance or retract a member in a linear fashion from a source of rotary motion such as an electric motor. A rack and pinion is a mechanism that will accomplish such an operation. The pinion is driven by a source of rotary motion and the rack will advance or retract linearly. Another type of mechanism to convert rotary motion to linear motion constitutes a nut and screw. Upon rotation of the nut, the screw will advance through the nut longitudinally thereby converting the rotary motion of the nut to linear motion. Many devices of various types are available to convert rotary motion, however, these devices are generally constructed to be operated from only one source of rotary motion and it is at time essential to advance or retract a member in a linear fashion from two different or separate sources of rotary motion and also to advance or retract the member at two different speeds controlled by two separate sources.

SUMMARY OF THE INVENTION

Briefly, the present invention is directed to a mechanical actuator for converting rotary motion from two different and separate sources to linear motion. A first member and a second member are rotatably supported within the housing of the mechanical actuator. A third member pasing axially through the first and second members and through the housing of the mechanical actuator is caused to advance or retract longitudinally relative to the housing upon rotation of either the first or the second member with the other member being fixed or restrained against rotation relative to the housing. With this arrangement, separate drive sources may be provided for the first and second members. The drive sources may be located on opposite sides of the actuator housing and may rotate the first and second members at different peripheral speeds to thereby advance or retract the third member at different speeds. With the herein described mechanical actuator it is now possible to advance and retract the driven member in a linear fashion by two separate drive members and where desired at two different speeds. Both drive members can be operated simultaneously in either direction to obtain desired linear movement of the driven member.

Accordingly, it is an object of the present invention to provide a mechanical actuator that will convert rotary motion from two different and separate sources to linear motion and accurately advance or retract the actuated member.

Another object of this invention is to provide a mechanical actuator that has a pair of separate drive members operable to advance or retract a driven member at different speeds.

These and other objects and advantages of this invention will be more completely disclosed and described in the following specification, the accompanying drawings and the appended claims.

BRIEF DESCRIPTION OF THE DRAWINGS

In the drawings:
FIGURE 1 is a longitudinal sectional view in side elevation of the mechanical actuator.
FIGURE 2 is a top plan view of the mechanical actuator illustrated in FIGURE 1.
FIGURE 3 is a schematic view of a pair of the mechanical actuators connected to a common drive motor and to other separate drive motors.

DESCRIPTION OF THE PREFERRED EMBODIMENTS

Referring to FIGURES 1 and 2 there is illustrated the mechanical actuator generally designated by the numeral 10 that includes a housing 12 in which there are positioned a pair of worm wheels 14 and 16. A threaded shaft or screw 18 extends through the housing 12 and through the respective worm wheels 14 and 16. The shaft 18 is connected to a driven or actuated member 20 which is restrained from rotation by suitable means (not shown) and is arranged to move the actuated member 20 linearly toward and away from the housing 12. As will be later explained in detail, the shaft 18 moves longitudinally within the housing 12 when worm wheel 14 is rotated and worm wheel 16 is stationary. Similarly, the shaft 18 will move longitudinally relative to the housing 12 upon rotation of worm wheel 16 when worm wheel 14 is stationary. Both worm wheels 14 and 16 may be rotated simultaneously to linearly advance or retract the member 20.

Now referring to the above described elements in greater detail, the housing 12 has a front wall 22 with an opening 24 therethrough and a rear wall 26 with a cover plate 28 positioned over an opening 30. The cover plate 28 is secured to the rear wall 26 by bolts 32 and has an opening 34 therein which is aligned with opening 24 in the housing front wall 22.

The worm wheel 14 is rotatably supported within the housing 12 by bearings 36 and 38. The worm wheel 14 has an axial bore 40 with a pair of inwardly extending keys 42 that extend longitudinally within the bore 40. The outer peripheral surface of worm wheel 14 has gearing 44 formed therein which meshes with the worm gearing 46 on transverse drive shaft 48. The transverse drive shaft 48 is rotatably mounted within housing 12 and is arranged to rotate the worm wheel 14. The pitch of the threads on the worm wheel 14 and drive shaft 48 are preferably designed to include a self-locking feature. Thus, when the worm wheel is subjected to a rotating force by the shaft 18, the pitch of the threads on worm wheel 14 and shaft 48 locks the worm wheel 14 against rotation.

The worm wheel 16 has an axial threaded bore 50 and an external worm gear surface 52. The worm wheel 16 is rotatably supported within the housing 12 on bearings 54 and 56 with the bore 50 aligned with bore 40 in worm wheel 14. A worm drive shaft 58 has an external geared portion 60 that meshes with the worm gear portion 52 of worm wheel 16 so that rotation of shaft 58 is transmitted to worm wheel 16 through the meshing geared surfaces 60 and 52. The pitch of the threads on worm wheel 16 and shaft 58 are also preferably designed to include the above discussed self-locking features.

The shaft or screw 18 has a first threaded section 62 and a pair of longitudinal keyways 64 and 66. The shaft 18 extends through the bores 40 and 50 of the respective worm wheels 14 and 16 with the threaded portion 62 threadably engaging the internal threads of bore 50 and the inwardly extending keys 52 of worm wheel 14 positioned in the respective keyways 62 and 64.

The shaft or screw 18 is illustrated as having a second threaded portion 68 that is positioned within the bore 70 of actuated member 20. It should be understood, however, the actuated member 20 could have other configurations, as for example, a thrust bearing, a conventional internally threaded member that is threadably secured to the threads 62 of screw 18 or a differential screw receiver as is illustrated in FIGURES 1 and 2. The actuated member 20 has a circular plug insert 72 that has a longitudinal threaded bore 74 in which the threaded portion 68 of screw 18 is threadably secured.

The mechanical actuator 10 transmits rotary motion of shafts 48 and 58 to linear motion of actuated member 20 in the following manner. Assuming that shaft 58 is stationary and not rotating, the worm wheel 16, because of the meshing geared portions 52 and 60 and the self-locking feature, is also stationary. Rotation of shaft 48 is transmitted through the geared surfaces 46 and 44 to rotate the worm wheel 14. Because the shaft 18 is non-rotatably secured to worm wheel 14 by the keys 42 extending into keyways 64 and 66, the shaft 18 rotates with the worm wheel 14. Rotation of shaft 18 in stationary worm wheel 16 advances or retracts the shaft 18 because the threaded portion 62 is threadably engaged in the threaded bore 50 of worm wheel 16. Because of the different pitch between threads 68 and 62 on shaft 18, the actuated member 20 advances or retracts at a different rate than the advancing or retracting of the shaft 18 to thus transmit linear motion to the actuated member 20.

The shaft 18 is advanced or retracted by the worm wheel 16 in the following manner. The worm wheel 14 is restrained from rotation by the shaft 48 and the shaft 18 is also restrained from rotation by the keys 42 extending into keyways 64 and 66 in shaft 18. Rotation of worm wheel 16 will advance or retract the nonrotating shaft 18 by the threaded bore 50 mating with the threads 62 of shaft 18 to thus advance or retract the actuated member 20. It should be noted that the actuated member 20, as illustrated, is restrained from rotation by any suitable means.

FIGURE 3 illustrates a schematic arrangement wherein a pair of mechanical actuators 10a and 10b have their shafts 48 connected through couplings 76 to shafts 78 and 80 extending from a motor 82. The actuator 10a has shaft 58 connected to a separate motor 84 through a reducer 86. Similarly, the actuator 10b has its shaft 58 connected to another motor 88 through a reducer 90. With this arrangement, when motor 82 is actuated, the shaft 48 for both actuators 10a and 10b are rotated in a pre- selected direction to thereby advance or retract the shafts 18 of both actuators 10a and 10b the same incremental distance. Where it is desired to move shaft 18 of actuator 10a, the motor 84 is energized while the motor 82 is de-energized to thereby advance or retract shaft 18 associated with actuator 10a. Similarly, where it is desired to advance or retract the shaft 18 associated with shaft 10b, the motor 28 is actuated to rotate the worm wheel 16 in actuator 10b and advance or retract the shaft 18. It will be appreciated that FIGURE 3 is exemplary only and shows only one arrangement for separately driving a pair of actuators 10a and 10b. Numerous other arrangements and configurations are possible without departing from the scope of the invention. FIGURE 3, however, illustrates the versatility of the actuator 10 for converting rotary motion from two separate sources to linear motion of an actuated member.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A mechanical actuator comprising, a housing, a first member having an axial bore rotatably supported within said housing, said first member having a key member extending inwardly into said axial bore, a first drive means drivingly connected to said first member, a second member having an axial bore rotatably supported within said housing, said last named axial bore having inwardly extending threads of a first pitch, a second drive means drivingly connected to said second member, a differential screw extending through said housing and through said axial bore of said first member and through said threaded axial bore of said second member, said differential screw having a first portion with first threads of a first pitch and a second portion with second threads of a different second pitch, said first portion positioned in said threaded bore of said second member, a third member having a bore therein with inwardly extending threads of said second pitch, said third member positioned adjacent said housing with said differential screw second portion extending into said bore of said third member with said threads of said second pitch threadedly engaged to said inwardly extending threads in said bore, said differential screw having a longitudinal keyway portion, said key member extending into said longitudinal keyway portion and nonrotatably connecting said first member to said differential screw, and said first member operable upon rotation to rotate said differential screw in said threaded bore of said second member and move said differential screw longitudinally relative to said second member and rotate said differential screw in said bore of said third member and move said third member relative to said housing, said second member operable upon rotation relative to said differential screw to move said differential screw longitudinally and move said third member relative to said housing, said first member operable to prevent rotation of said differential screw while said second member rotates relative thereto.

2. The apparatus of claim 1 wherein said first member comprises a first worm wheel and said second member comprises a second worm wheel, and said first drive means comprises a screw and said second drive means comprises a screw.

3. The apparatus of claim 1 wherein said first member having an axial bore and said second member having an axial bore are rotatably supported within said housing with said axial bores in alignment.

4. A mechanical actuator operable from either of two rotary drive means to convert the rotary motion of said drive means to linear motion comprising, a housing, a first worm wheel having an axial bore rotatably supported within said housing, said axial bore within said first worm wheel having a key therein, a first screw drivingly connected to said first worm wheel, a second worm wheel having an axial bore rotatably supported within said housing, said axial bore within said second worm wheel having threads therein, a second screw drivingly connected to said second worm wheel, an elongated differential screw having a first portion with first threads of a first pitch and a second portion with second threads of a different second pitch and including a keyway extending through said axial bore of said first worm wheel and through said axial bore of said second worm wheel, said differential screw first portion threadedly secured in said second worm wheel threaded bore, an actuated member having a bore therein with inwardly extending threads of said second pitch, said actuated member positioned adjacent said housing with said differential screw second portion extending into said actuated member bore with said threads of said second pitch threadedly engaged to said inwardly extending threads in said bore, said first worm wheel key received in said differential screw keyway to nonrotatably secure said differential screw relative to said first worm wheel and permit longitudinal movement of said differential screw within said axial bore of said first worm wheel upon rotation of said second worm wheel while said first worm wheel remains fixed by its associated first screw and move said actuated member relative to said housing by the longitudinal movement of said differential screw, and said first worm wheel operable upon rotation to rotate said differential screw in said threaded bore of said second worm wheel while said second worm wheel remains fixed relative to said housing by its associated second screw and rotates said differential screw in said bore of said actuated member to move said actuated member relative to said housing.

References Cited

UNITED STATES PATENTS

| | | | |
|---|---|---|---|
| 3,389,612 | 6/1968 | Thireau | 74—89.15 |
| 2,520,014 | 8/1950 | Rehnberg et al. | 77—34.7 |
| 2,930,587 | 3/1960 | Seawright | 77—34.4 |

FRED C. MATTERN, Jr., Primary Examiner

F. D. SHOEMAKER, Assistant Examiner

U.S. Cl. X.R.

74—89.15, 424.8